July 25, 1933.　　　F. D. CHAPMAN　　　1,919,185
COOKER AND COOLER
Filed May 21, 1930　　　2 Sheets-Sheet 1

INVENTOR.
Frank D. Chapman,
BY Morsell, Keeney & Morsell
ATTORNEYS.

July 25, 1933.  F. D. CHAPMAN  1,919,185
COOKER AND COOLER
Filed May 21, 1930   2 Sheets-Sheet 2
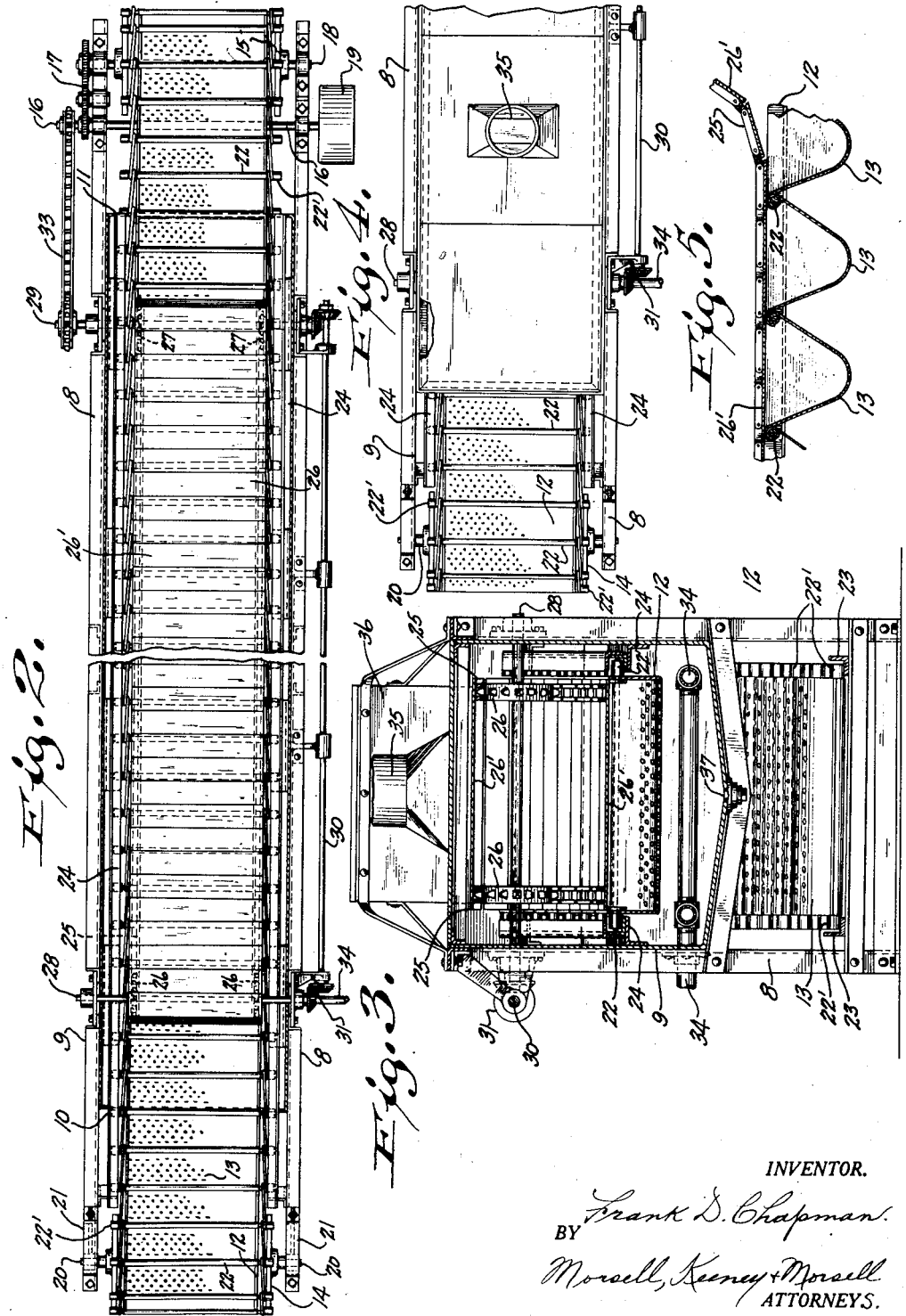
INVENTOR.
Frank D. Chapman
BY
Morsell, Keeney & Morsell
ATTORNEYS.

Patented July 25, 1933

1,919,185

UNITED STATES PATENT OFFICE

FRANK D. CHAPMAN, OF BERLIN, WISCONSIN

COOKER AND COOLER

Application filed May 21, 1930. Serial No. 454,302.

This invention relates to a cooker and cooler more particularly, although not solely, adapted for cooking or cooling vegetables such as beans, peas, spinach, and so forth, in canning plants.

It is one of the objects of the present invention to provide a cooker and cooler in which an endless bucket chain for conveying the material is positively directed below the surface of the heating fluid contained within the tank of the machine.

A further object of the invention is to provide a cooker and cooler in which the endless chain cover for the conveyor portions moving the material are pushed to provide the necessary sag in passing through the heat zone in the machine.

A further object of the invention is to provide a cooker and cooler in which the portion of the bucket chain passing through the heat zone of the machine is temporarily covered to prevent the vegetables or other material from accidentally floating out or being otherwise discharged from the buckets while the buckets are submerged.

A further object of the invention is to provide a cooker and cooler in which heating coils are submerged in the water in the tank to form the heating zone.

A further object of the invention is to provide a cooker and cooler having inclined guides for both the bucket chain and the cover chain to properly aline and register the two chains in passing through the heat zone.

A further object of the invention is to provide a cooker and cooler which is of simple construction, is strong and durable and is efficient in operation.

With the above and other objects in view, the invention consists of the improved cooker and cooler as set forth in the claims, and all equivalents thereof.

In the accompanying drawings in which the same reference characters indicate the same parts in all of the views:

Fig. 2 is a horizontal sectional view thereof taken on line 2—2 of Fig. 1;

Fig. 3 is a transverse sectional view taken on line 3—3 of Fig. 1;

Fig. 4 is a top detail view of the charging end of the cooker and cooler; and

Fig. 5 is a detail vertical sectional view on a larger scale of some of the buckets and covering therefor.

Figure 1:
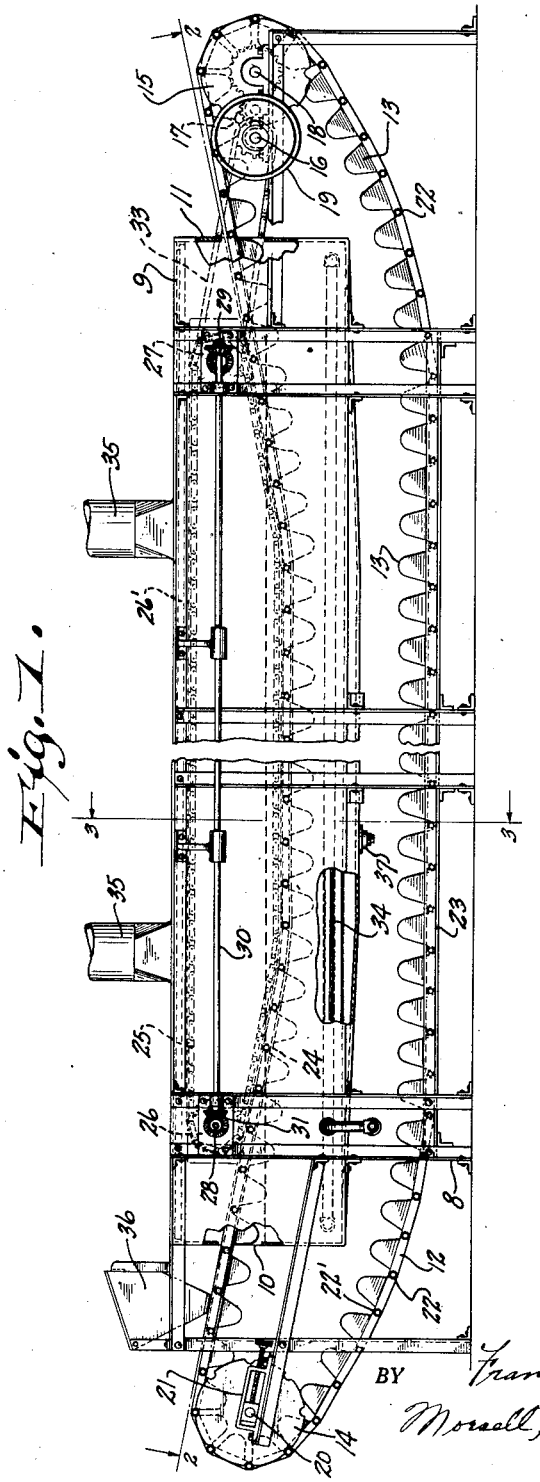
Fig. 1 is a side view of the cooker and cooler, parts broken away to show interior construction.

Referring to the drawings, the reference numeral 8 indicates a frame of elongated form upon which is mounted a closed elongated rectangular tank 9 having opposite end elongated inlet and outlet openings 10 and 11 through which the endless chain bucket conveyor 12 passes. The endless chain is formed with perforated buckets 13 and is mounted upon sprocket wheels 14 and 15 positioned at opposite ends of the frame 8. A drive shaft 16 journaled on the frame has a geared connection 17 with the shaft 18 upon which the sprocket wheels 15 are mounted. A belt wheel 19 mounted on the shaft 16 is provided for belted connection with a source of power, and the shaft 20, carrying the sprocket wheel 14, is journaled in an adjustable bearing 21 to permit tightening the chain as desired.

The endless chains forming the conveyor are spaced apart to accommodate the perforated buckets 13 positioned therebetween and are connected thereto and to each other by transverse rods 22 which project beyond the outer side portions of the chains and are provided with rollers 22' on their outer end portions. The opposite side portions of the frame are provided with angle metal tracks 23 into which the rollers 22' extend and move to support the lower portion of the travel of the conveyor. Tracks 24, U-shaped in cross-section, extending longitudinally through and on opposite inner sides of the tank 9, receive the chain rollers 22' to guide the conveyor through the tank. Said tracks 24 incline downwardly into the tank from both ends to guide the conveyor buckets below the surface of the water within the tank.

To maintain the food material within the buckets while passing through and below the surface of the water, a pair of spaced endless sprocket chains 25 are mounted on sprocket wheels 26 and 27 journaled in the upper portion of the tank with the lower portions of the chains in close proximity to the upper portion of the conveyor. Said sprocket chains are connected together by transverse cover plates 26' which contact the upper portions of the buckets when in the water in the tank and form temporary covers for said buckets while the buckets are passing through the water, as indicated in Fig. 1. The cover plates travel at the same rate of speed as the conveyor buckets and to maintain a tight closure therewith and a proper sag to the lower portion of the chains, both shafts 28 and 29 are connected to a longitudinally extending shaft 30 by bevel gears 31 and 32. The shaft 29 is driven by a sprocket chain and wheel connection 33 with the drive shaft 16.

Longitudinally extending perforated steam pipes 34 extend into the tank beneath the surface of the water to heat the water and the upper portions of the tank are provided with steam stacks 35 to permit the escape of steam and vapor from the tank.

A feed hopper 36 is positioned above the conveyor adjacent the inlet opening 10 of the tank to feed the food material to the buckets before the buckets enter the tank.

The bottom portion of the tank is inclined downwardly medially of its length and is provided with a plugged opening 37 to permit draining the water from the tank when desired.

In operation the food material is dropped into the buckets while the upper portion of the conveyor is moving to the right towards the tank. As soon as the filled buckets enter the tank and before being submerged in the water they will move into the path of travel of the cover plates carried by the endless chain and each bucket will in turn be closed by the cover plates and remain closed during their submerged travel. As the water is heated by the steam the food material will be cooked during its travel through the tank, and the degree of cooking may be controlled by the time period required to pass the buckets through the tank and the temperature of the water in the tank. Food material may also be cooled by using cold water in the tank and passing the food material therethrough.

From the foregoing description it will be seen that the cooker and cooler is well adapted for the purpose described.

What I claim as my invention is:

1. A cooker and cooler, comprising a tank having an inlet and an outlet opening, a conveyor having a series of buckets traveling through the openings and below the surface of liquid within the tank, and means having a series of plates movable with said conveyor for temporarily covering the conveyor buckets while submerged in the liquid in the tank.

2. A cooker and cooler, comprising a tank having end inlet and outlet openings, an endless bucket conveyor traveling through the openings and below the surface of water within the tank, and an endless means having cover plates for temporarily covering the conveyor buckets while they are submerged in the water in the tank.

3. A cooker and cooler, comprising a tank having an inlet opening at one end and an outlet opening at its opposite end, an endless bucket conveyor having its upper portion extending through the tank openings above the level of water and a medial portion being submerged in the water, and an endless means having cover plates for temporarily covering the conveyor buckets while they are submerged in the water in the tank.

4. A cooker and cooler, comprising a tank having an inlet opening at one end and an outlet opening at its opposite end, an endless bucket conveyor having its upper portion extending through the tank openings above the level of water and a medial portion being submerged in the water, means extending into the tank for heating the water therein, and an endless means having cover plates for temporarily covering the conveyor buckets while they are submerged in the water in the tank.

5. A cooker and cooler, comprising a tank having an inlet opening at one end and an outlet opening at its opposite end, guides within and on opposite sides of the tank and extending at an angle below the plane of the tank openings, an endless bucket conveyor having its upper portion extending through the tank openings and engaging the guides to cause the conveyor portion to travel below the surface of water in the tank, and an endless means having cover plates for temporarily covering the conveyor buckets while they are submerged in the water in the tank.

6. A cooker and cooler, comprising an elongated frame, a tank supported thereon and having an inlet opening at one end and an outlet opening at its opposite end, downwardly and upwardly inclined guides on the inner opposite sides of the tank and extending below the level of water within the tank, an endless bucket conveyor having its upper portion extending through the tank openings and engaging the guides to cause the conveyor portion to travel below the surface of the water in the tank, and endless chain means having cover plates for temporarily covering the conveyor buckets while they are submerged in the water in the tank.

7. A cooker and cooler, comprising an elongated frame, an elongated tank supported thereon and having an inlet opening at one end and an outlet opening at its opposite end, guides on the inner opposite sides of the tank and extending at a downward incline from the inlet opening and then horizontally for a distance and then inclining upwardly to the outlet opening, the horizontal portions being below the surface of water within the tank, an endless bucket conveyor extending through the openings in the tank and below the surface of the water within the tank, the portion extending into the tank engaging the guides and traveling below the surface of the water therein, and means traveling with and temporarily covering the conveyor buckets while they are traveling beneath the surface of the water in the tank.

8. A cooker and cooler, comprising an elongated frame, an elongated tank supported thereon and having an inlet opening at one end and an outlet opening at its opposite end, guides on the inner opposite sides of the tank and extending at a downward incline from the inlet opening and then horizontally for a distance and then inclining upwardly to the outlet opening, the horizontal portions being below the surface of water within the tank, an endless bucket conveyor extending through the openings in the tank and below the surface of the water within the tank, the portion extending into the tank engaging the guides and traveling below the surface of the water therein, and an endless belt means having plates which travel with and temporarily cover the conveyor buckets while they are traveling beneath the surface of the water in the tank.

9. A cooker and cooler, comprising an elongated frame, an elongated tank supported thereon and having an inlet opening at one end and an outlet opening at its opposite end, guides on the inner opposite sides of the tank and extending at a downward incline from the inlet opening and then horizontally for a distance and then inclining upwardly to the outlet opening, the horizontal portions being below the surface of water within the tank, an endless bucket conveyor extending through the openings in the tank and below the surface of the water within the tank, the portion extending into the tank engaging the guides and traveling below the surface of the water therein, an endless belt means having plates which travel with and temporarily cover the conveyor buckets while they are traveling beneath the surface of the water in the tank, and perforated pipes extending into the water in the tank to heat said water.

10. A cooker and cooler, comprising a frame, a tank connected thereto and having an inlet opening at one end and an outlet opening at its opposite end, an endless bucket conveyor journaled on the frame and having its upper portion traveling through the openings and beneath the surface of water in the tank, an endless means driven in a manner to form a sag in the lower portion of the means which will travel with and temporarily rest upon the upper portion of the bucket conveyor while said upper conveyor portion is submerged, and means for moving the bucket conveyor and the endless means at the same rate of speed.

11. A cooker and cooler, comprising a frame, a tank connected thereto and having an inlet opening at one end and an outlet opening at its opposite end, an endless bucket conveyor journaled on the frame and having its upper portion traveling through the openings and beneath the surface of water in the tank, spaced sprocket wheels journaled in the tank, an endless chain means mounted on the sprocket wheels and having plates which intimately cover the conveyor buckets while they are traveling beneath the surface of the water in the tank, means for positively driving both sprocket wheels to sag the lower portion of travel of the endless chain means, and means for driving the bucket conveyor.

12. A cooker and cooler, comprising a frame, a tank connected thereto and having an inlet opening at one end and an outlet opening at its opposite end, an endless bucket conveyor journaled on the frame and having its upper portion traveling through the openings and beneath the surface of water in the tank, spaced sprocket wheels journaled in the tank, an endless chain means mounted on the sprocket wheels and having plates which intimately cover the conveyor buckets while they are traveling beneath the surface of the water in the tank, a perforated pipe extending into the tank to heat the water, means for positively driving both sprocket wheels to sag the lower portion of travel of the endless chain means, and means for driving the bucket conveyor.

13. A cooker and cooler, comprising a frame, a tank connected thereto and having an inlet opening at one end and an outlet opening at its opposite end, an endless bucket conveyor journaled on the frame and having its upper portion traveling through the openings and beneath the surface of water in the tank, said tank also having a vapor outlet opening, means for feeding food material into the conveyor buckets before said buckets are submerged in the water, spaced sprocket wheels journaled in the tank, an endless chain means mounted on the sprocket wheels and having plates which intimately cover the conveyor buckets while they are traveling beneath the surface of the water in the tank, means for positively driving both sprocket wheels to sag the lower portion of travel of the endless chain means, and means for driving the bucket conveyor.

14. A cooker and cooler, comprising a frame, a tank connected thereto and having an inlet opening at one end and an outlet opening at its opposite end, an endless bucket conveyor journaled on the frame and having its upper portion traveling through the openings and beneath the surface of water in the tank, said tank also having a vapor outlet opening, means for feeding food material into the conveyor buckets before said buckets are submerged in the water, a perforated pipe extending into the tank for heating the water therein, spaced sprocket wheels journaled in the tank, an endless chain means mounted on the sprocket wheels and having plates which intimately cover the conveyor buckets while they are traveling beneath the surface of the water in the tank, means for positively driving both sprocket wheels to sag the lower portion of travel of the endless chain means, and means for driving the bucket conveyor.

15. An apparatus for treating foodstuffs, comprising a tank adapted to contain a treating liquid, a conveyor having a series of buckets traveling into said tank and below the surface of the liquid therewithin, and means having a series of plates for temporarily covering the conveyor buckets while the latter are submerged in the liquid in the tank.

16. An apparatus for treating foodstuffs, comprising a tank adapted to contain a treating liquid, an endless bucket conveyer traveling into said tank and below the surface of the liquid therewithin, and an endless means having cover plates movable with said conveyor for temporarily covering the conveyor buckets while they are submerged in the liquid in the tank.

17. An apparatus for treating foodstuffs, comprising a tank adapted to contain a treating liquid, an endless bucket conveyer having its upper portion at the ends thereof extending above the level of the liquid within the tank, the medial section of the upper portion of said endless bucket conveyor being submerged in the liquid in said tank, and an endless means having cover plates for temporarily covering the conveyer buckets while they are submerged in the liquid in said tank.

18. An apparatus for treating foodstuffs, comprising a tank adapted to contain a treating liquid, guides within said tank, an endless bucket conveyer the upper portion of which coacts with said guide means to cause the conveyer buckets to travel below the surface of the liquid within said tank, and an endless means having cover plates for temporarily covering the conveyer buckets while they are submerged in the liquid in said tank.

19. An apparatus for treating foodstuffs, comprising an elongated tank adapted to contain a treating liquid, downwardly and upwardly inclined guides within said tank and extending below the level of the liquid within said tank, an endless bucket conveyer the upper portion of which engages said guides to cause the conveyer buckets to travel below the surface of the liquid in said tank, and an endless means having cover plates for temporarily covering the conveyer buckets while they are submerged in the liquid in said tank.

20. An apparatus for treating foodstuffs, comprising an elongated tank adapted to contain a treating liquid, guides within said tank and extending at a downward incline from one end of said tank and then horizontally for a distance and then inclining upwardly at the other end of said tank, the horizontal portion being below the surface of the liquid within said tank, an endless bucket conveyer extending into the tank and below the surface of the liquid therewithin, the portion of the endless bucket conveyer extending into the tank engaging the guides and traveling below the surface of the liquid within said tank, and means traveling with and temporarily covering the conveyer buckets while they are traveling beneath the surface of the liquid in said tank.

21. An apparatus for treating foodstuffs, comprising an elongated tank adapted to contain a treating liquid, guides within said tank and extending at a downward incline from one end of said tank and then horizontally for a distance and then inclining upwardly at the other end of said tank, the horizontal portion being below the surface of the liquid within said tank, an endless bucket conveyer extending into the tank and below the surface of the liquid therewithin, the portion of the endless bucket conveyer extending into the tank engaging the guides and traveling below the surface of the liquid within said tank, and an endless belt means having plates which travel with and temporarily cover the conveyer buckets while they are traveling beneath the surface of the liquid in said tank.

22. An apparatus for treating food, comprising, a tank adapted to contain a treating liquid therein, a conveyor having a succession of food confining receptacles movable through and below the surface of the liquid in said tank, and means movable with said conveyer for temporarily covering said receptacles while submerged in said liquid.

23. An apparatus for treating food, comprising, a tank adapted to contain a treating liquid therein, a conveyor having an endless succession of food confining receptacles movable through and below the surface of the liquid in said tank, and means having a series of closure portions movable with said conveyor for temporarily covering said receptacles while submerged in said liquid.

24. An apparatus for treating food, comprising, a tank adapted to contain a treating liquid therein, an endless conveyor having a succession of food confining receptacles movable through and below the surface of the liquid in said tank, and endless means having a series of closure portions for temporarily covering said receptacles while submerged in said liquid.

FRANK D. CHAPMAN.